(12) United States Patent
Melikian

(10) Patent No.: US 8,787,678 B2
(45) Date of Patent: Jul. 22, 2014

(54) SYSTEM AND METHOD FOR VISUAL SEARCHING OF OBJECTS USING LINES

(75) Inventor: Simon Melikian, Westlake, OH (US)

(73) Assignee: Reognition Robotics, Westlake, OH (US)

(*) Notice: Subject to any disclaimer, the term of this patent is extended or adjusted under 35 U.S.C. 154(b) by 0 days.

(21) Appl. No.: 12/941,706

(22) Filed: Nov. 8, 2010

(65) Prior Publication Data

US 2011/0052046 A1 Mar. 3, 2011

Related U.S. Application Data

(62) Division of application No. 11/557,123, filed on Nov. 7, 2006, now Pat. No. 7,831,098.

(51) Int. Cl.
*G06K 9/48* (2006.01)

(52) U.S. Cl.
USPC .......................... 382/199; 382/159; 382/197

(58) Field of Classification Search
USPC .................................. 382/155, 159, 197, 199
See application file for complete search history.

(56) References Cited

U.S. PATENT DOCUMENTS

| | | | |
|---|---|---|---|
| 4,949,281 A * | 8/1990 | Hillenbrand et al. .......... 345/442 |
| 4,972,495 A * | 11/1990 | Blike et al. .................... 382/304 |
| 5,926,568 A * | 7/1999 | Chaney et al. ................. 382/217 |
| 6,477,275 B1 * | 11/2002 | Melikian et al. .............. 382/217 |
| 6,636,634 B2 * | 10/2003 | Melikian et al. .............. 382/217 |
| 6,868,175 B1 * | 3/2005 | Yamamoto et al. ............ 382/145 |
| 6,980,942 B2 * | 12/2005 | Kusunoki et al. ............... 703/14 |
| 7,006,694 B1 * | 2/2006 | Melikian et al. .............. 382/199 |
| 7,227,983 B1 * | 6/2007 | Christian et al. .............. 382/141 |
| 7,415,156 B2 * | 8/2008 | McCormack et al. ......... 382/203 |
| 7,426,302 B2 * | 9/2008 | Amico et al. .................. 382/203 |
| 7,502,511 B2 * | 3/2009 | McCormack et al. ......... 382/203 |
| 7,796,780 B2 * | 9/2010 | Lipton et al. .................. 382/103 |
| 7,831,098 B2 * | 11/2010 | Melikian ........................ 382/215 |
| 2001/0025233 A1 * | 9/2001 | Kusunoki et al. ............... 703/14 |
| 2005/0119779 A1 * | 6/2005 | Amico et al. .................. 700/132 |
| 2006/0171592 A1 * | 8/2006 | Amico et al. .................. 382/203 |
| 2007/0211061 A1 * | 9/2007 | Kokojima ...................... 345/441 |
| 2008/0107345 A1 * | 5/2008 | Melikian ........................ 382/209 |

* cited by examiner

*Primary Examiner* — Aaron W Carter
(74) *Attorney, Agent, or Firm* — Renner, Otto, Boisselle & Sklar, LLP.

(57) ABSTRACT

Disclosed is method of visual search for objects that include straight lines. A two-step process is used, which includes detecting straight line segments in an image. The lines are generally characterized by their length, midpoint location, and orientation. Hypotheses that a particular straight line segment belongs to a known object are generated and tested. The set of hypotheses is constrained by spatial relationships in the known objects. The speed and robustness of the method and apparatus disclosed makes it immediately applicable to many computer vision applications.

17 Claims, 25 Drawing Sheets

SYSTEM AND METHOD FOR VISUAL SEARCHING OF OBJECTS USING LINES

RELATED APPLICATION DATA

This application is a divisional of U.S. application Ser. No. 11/557,123, filed Nov. 7, 2006 and issued as U.S. Pat. No. 7,831,098 on Nov. 9, 2010, which is incorporated herein by reference in its entirety.

TECHNICAL FIELD OF THE INVENTION

The present invention relates to the field of computer vision, and more particularly, to a system and method for pattern identification of a learned image (or pattern) in a target image, wherein the learned image (or pattern) and the target image have linear features.

DESCRIPTION OF THE RELATED ART

Computer vision generally relates to the theory and technology for building artificial systems that obtain information from images or multi-dimensional data. As used herein "information" means anything that enables a decision to be fully and/or partially based. Exemplary computer vision applications include: controlling processes (e.g. an industrial robot or an autonomous vehicle), detecting events (e.g. for visual surveillance), organizing information (e.g. for indexing databases of images and image sequences), modeling objects or environments (e.g. industrial inspection, medical image analysis or topographical modeling), interaction (e.g. as the input to a device for computer-human interaction), etc. A subset of computer vision is machine vision, which is the application of computer vision to industry and manufacturing.

A goal of computer vision is to make a computer "see". In order to make a computer "see" in an unconstrained environment an extraordinary amount of computational power, perhaps on the order of $10^{15}$ operations per second likely is needed. Even if such a speed was possible in a commercial computer vision system, it is difficult to perform rapid visual searches in unconstrained, natural environments.

To make search and recognition tasks tractable in commercial computer vision, designers typically limit the task's visual complexity. This may be done in a variety of example, the vision system may be set up to view and recognize only one or a small class of objects. Second, the presentation (position, orientation, size, view, etc.) of these objects is strictly controlled. Thus, the object variability is limited to the point that the vast majority of variables are eliminated and the search and can be implemented with reasonable cost in terms of both computing time and money.

For example, when packaging ice cream, the vision system must recognize a package lid from a small class of lids (e.g., Vanilla, Chocolate, Raspberry, etc.). To reduce visual complexity, a designer will typically use a uniform light source and present the various lids in a plane parallel to the camera's sensor to eliminate perspective distortions.

Computer vision systems generally lack the knowledge needed to constrain and interpret a general visual search (e.g., an uncontrolled environment). Therefore, practical computer vision search requires the designer to drastically restrict what the vision system sees and to add a priori knowledge about what it will see so that it can interpret the result. Thus, a major drawback to computer vision in real world applications is the time, money and specialized knowledge needed for such applications to be adequately performed.

The evolution of computer vision in the last twenty years was driven by improvements in hardware and algorithms. A variety of computer vision methods have been developed for image detection (also referred to herein as pattern recognition). These techniques include, for example, using binary images to represent gray scale images, normalized grayscale correlation, blob analysis, geometric based search and recognition, contour based search, affine invariant constellation based recognition, corner detection, salient icon detection, scale invariant feature transform, etc.

Limitations with these various techniques include, for example: requiring uniform lighting, applying a threshold value to the image, multiple objects in an image can confound blob distributions, difficult or impossible to recover object orientation from projections, computational intensive, time intensive, a variety of templates for the same image, constrain the parts seen by a machine vision system, not practical for uncontrolled environments, etc.

SUMMARY

A strong need exists in the art of computer vision for improving visual search to handle wider variations in target presentation, lighting, and size (e.g., scale). As the vision system becomes more robust to object variation, the need to restrict the system's view by positioning and lighting is reduced, and the development time and costs to put a priori knowledge into the system are reduced. Rather than laboriously testing every possible match of a template (part model) to any possible view (location, orientation and scale) of an object, aspects of the present invention relates to a system and method for finding straight lines in learned images and target images and use the straight lines as salient features or icons to determine if a learned image matches a target image or vice versa.

One aspect of the present invention relates to a method for matching a learned object with a target object, the method comprising: providing at least one learned object and at least one target object, wherein the learned object and the target object include at least one line segment; selecting at least one line segment from at least one learned object; determining the amount of translation, rotation, and scaling needed to transform the line segment of the learned object to have one or more lines substantially the same size as lines on the target object; determining if the learned object matches the target object based at least in part on the step of determining the amount of translation, rotation, and scaling needed to transform the line segment of the learned object to have one or more lines substantially the same size as lines on the target object.

Another aspect of the present invention relates to a method for matching a learned object with a target object, the method comprising: providing at least one learned object and at least one target object, wherein the learned object and the target object have a plurality of contour points, wherein contour points having a curvature below a certain threshold value are grouped together to form at least one line segment; extracting at least one line segment from the learned image; determining the amount of translation, rotation, and scaling needed to transform the line segment of the learned object to have one or more lines substantially the same size as lines on the target object; and determining if the learned object matches the target object based at least in part on the step of determining the amount of translation, rotation, and scaling needed to transform the line segment of the learned object to have one or more lines substantially the same size as lines on the target object.

According to an aspect of the invention, the at least one line segment selected in the step of selecting at least one line segment has a plurality of contour points.

According to an aspect of the invention, the plurality of contour points are detected using an edge detection algorithm.

According to an aspect of the invention, the step of determining the amount of translation, rotation and scaling for the learned object utilizes a transform matrix.

According to an aspect of the invention, the transform matrix includes a position, an orientation and a scale of the target image.

According to an aspect of the invention, the transform matrix includes a quality of fit between the learned object and the target object.

According to an aspect of the invention, the quality of fit between the learned object and the target object is determined by summing the Euclidian distances between corresponding contour points in the learned image and the target image.

According to an aspect of the invention, tracking a target image and outputting a control signal to one or more electrical devices based on the determination if the learned object matches the target image.

According to an aspect of the invention, fitting an analytical line using linear regression for at least one line segment in the target image.

According to an aspect of the invention, the analytical line is determined by calculating a midpoint of the line segment, wherein the midpoint is an average of a beginning end point and an ending endpoint for the line segment.

Another aspect of the present invention relates to a method for matching a learned object with a target object, the method comprising: a) providing at least one learned object and at least one target object, wherein the learned object and the target object have a plurality of contour points, wherein contour points having a curvature below a certain threshold value are grouped together to form at least one line segment; b) extracting at least one line segment from the target image, wherein the selected line segment corresponds to a longest line segment of the target image; c) extracting at least one line segment from the learned image, wherein the selected line segment corresponds to a longest line segment of learned image; d) determining a transformation hypothesis that maps the learned image to the target image; e) selecting a next longest line segment from the learned image and the target image; f) determining if the learned object matches the target image based at least in part on the step of determining a transformation hypothesis that maps the learned image to the target image.

According to an aspect of the invention, if the learned object does not match the target object, another learned image is selected and steps c) through f) are repeated.

According to an aspect of the invention, wherein the step of determining if the learned object matches the target object is determined by calculating a ratio of the lengths of the corresponding line segments of the learned image and the target image.

According to an aspect of the invention, verifying a match between the learned image and the target image.

According to an aspect of the invention, the match is determined by calculating a distance along a gradient direction from a contour point to a target edge point for each of the contours associated with the learned image.

According to an aspect of the invention, tracking a target image and outputting a control signal to one or more electrical devices based on the determination if the learned object matches the target image.

Another aspect of the present invention relates to a method for training a computer vision system to recognize a reference shape, the method comprising: providing a reference shape; extracting line segment information from one or more contour points in the reference shape by grouping contour points having a curvature at or near zero as a line; and storing the line segment information in a computer readable form.

According to an aspect of the invention, the line segment information includes at least one from the group consisting of: an endpoint, a midpoint, a line angle or a line length for the one or more line segments.

According to an aspect of the invention, the line segment information includes at least one contour point.

According to an aspect of the invention, the line segment information includes a vector from the midpoint for each of the one or more line segments to a reference point.

According to an aspect of the invention, the computer readable form is a database.

According to an aspect of the invention, the reference shape is provided from an electronic computer aided design file.

Another aspect of the present invention relates to a program stored on a machine readable medium, the program being suitable for use in matching a learned object with a target object, wherein when the program is loaded in memory of an associated computer and executed, causes extracting at least one line segment from a learned image and a target image, wherein the selected line segment corresponds to a longest line segment of the image; determining a transformation hypothesis that maps the learned image to the target image; selecting a next longest line segment from the learned image and the target image; and determining if the learned object matches the target image based at least in part on the step of determining a transformation hypothesis that maps the learned image to the target image.

According to an aspect of the invention, the program further includes tracking a target image and outputting a control signal to one or more electrical devices based on the determination if the learned object matches the target image.

Another aspect of the invention relates to a method for learning an object, the method comprising: providing an object in electronic form, wherein the object includes at least one linear feature formed by a plurality of contour points; extracting at least one icon from the object, wherein the icon includes at least one end point associated with the linear feature, wherein the icon has a size determined by a distance between an end contour point and the one end point, wherein the end contour point is an outermost contour point from a series of contour points having a curvature below a curvature threshold value in from the one end point.

According to an aspect of the invention, the at least one icon is scale and rotation invariant.

According to an aspect of the invention, the at least one icon is extracted for all linear features of the object having a segment length above a length threshold value.

According to an aspect of the invention further includes fitting an analytic line on the line segment using linear regression for representation of the icon.

According to an aspect of the invention, the analytic line utilizes the end point associated with the linear feature and the end contour point.

According to an aspect of the invention, storing information related to the at least one icon in a database of icons.

According to an aspect of the invention, the at least one icon is stored for all linear features of the object having a segment length above a length threshold value.

According to an aspect of the invention, the information includes a length associated with at least one icon.

According to an aspect of the invention, the information includes a scale associated with at least one icon.

According to an aspect of the invention, the information includes an icon angle, wherein the icon angle is the relation between the icon and a reference point in the object.

Another aspect of the invention relates to a method for matching a learned object with a target object, the method comprising: providing at least one learned icon in electronic form, wherein the learned icon is associated with a learned object, wherein the learned icon includes at least a learned icon length and an angle; providing a target object in electronic form; selecting a first learned icon; extracting a first target icon from the target object; determining the amount of translation, rotation, and scaling needed to transform the first learned icon to have one or more lines substantially the same size as the first target icon; and determining if the learned object matches the target object based at least in part on the step of determining the amount of translation, rotation, and scaling needed to transform the first learned icon to have one or more lines substantially the same size as the first target icon.

According to an aspect of the invention, the first learned icon has a length larger than other icons associated with the learned object.

According to an aspect of the invention, the amount of translation is determined by aligning a midpoint associated with the first learned icon with a midpoint associated with the first target icon.

According to an aspect of the invention, the amount of rotation is determined by aligning the first learned icon to overlay the first target icon.

According to an aspect of the invention, the amount of scaling is determined by dividing the length of the first learned icon by the length of the first target icon.

According to an aspect of the invention, the step of determining the amount of translation, rotation and scaling for the learned object utilizes a transform matrix.

According to an aspect of the invention, the transform matrix includes a quality of fit between the learned object and the target object.

According to an aspect of the invention, the quality of fit between the learned object and the target object is determined by summing Euclidian distances between corresponding contour points in the learned image and the target image, wherein the contour points are linear features associated with each of the learned image and the target image.

According to an aspect of the invention further including outputting a control signal to one or more electrical devices based on the determination that the learned object matches the target image.

Another aspect of the invention is related to a method for matching a learned object with a target object, the method comprising: providing at least one learned object, wherein the learned object has a plurality of contour points, wherein contour points having a curvature below a certain threshold value are grouped together to form a learned icon, wherein the learned icon has a first end point and a second end point; providing a target object in electronic form; selecting at least one learned icon; extracting a first target icon from the target object; determining the amount of translation, rotation, and scaling needed to transform the learned icon to have a size and shape that corresponds to the target icon; and determining if the learned object matches the target object based at least in part on the step of determining the amount of translation, rotation, and scaling needed to transform the learned icon to have a size and shape that corresponds to the target icon.

Other systems, devices, methods, features, and advantages of the present invention will be or become apparent to one having ordinary skill in the art upon examination of the following drawings and detailed description. It is intended that all such additional systems, methods, features, and advantages be included within this description, be within the scope of the present invention, and be protected by the accompanying claims.

It should be emphasized that the term "comprise/comprising" when used in this specification is taken to specify the presence of stated features, integers, steps or components but does not preclude the presence or addition of one or more other features, integers, steps, components or groups thereof."

BRIEF DESCRIPTION OF THE DRAWINGS

The foregoing and other embodiments of the invention are hereinafter discussed with reference to the drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

The present invention is directed to a system and method for pattern identification of learned image (or learned pattern) in a target image, wherein the learned image and the target image have linear features. This application is based on a doctoral thesis entitled "Visual Search For Objects With Straight Lines", submitted by the inventor of the subject application in January 2006 to the Department of Electrical Engineering and Computer Science of Case School of Engineering, the entirety of which is incorporated by reference as if fully rewritten herein.

Figure 1:
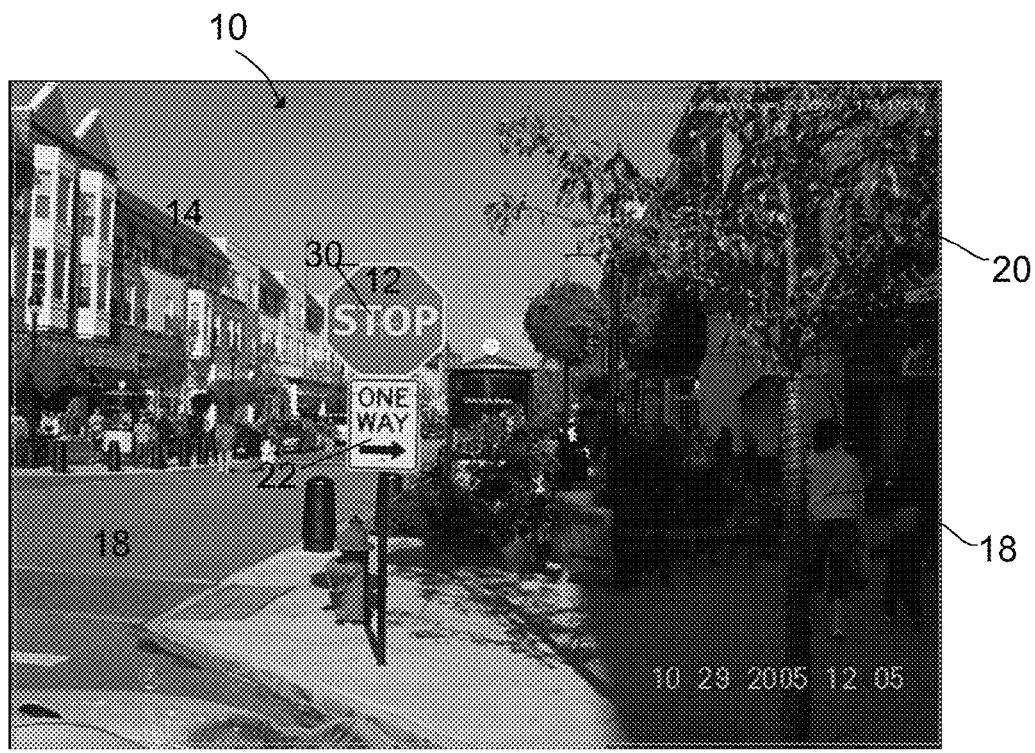
FIG. 1 is an exemplary image in accordance with aspects of the present invention.

Referring to FIG. 1, an exemplary image 10 is shown. Image 10 may be a digital image, a portion of an object or image, an electronic representation of an image, etc. As shown, image 10 is a digital image of an outdoor scene. It may be desirable for a machine to determine the precise location and/or orientation of one or more items (or patterns) in this scene. This information may be used in any desirable manner, so that a controller, a device, or other electronic device may properly interact with software that is capable of detect optical objects in order to facilitate controlling, assembly and/or processing information related to the item.

For example, it may be desirable to find a target 12 (e.g., a stop sign) located within this image. The ability to locate and/or track the target 12 may be useful for a variety of applications. For example, autonomous vehicle guidance, providing "sight" to electronic equipment, etc.

Image 10 may include one or more items within the image. In FIG. 1, image 10 includes target 12, buildings 14, persons 16, a street 18, a tree 20, a traffic sign 22, etc. Each item includes a variety of contours 30. In general, contours 30 may be thought of as being an ordered list of edge point coordinates that describe a boundary of an item or pattern located in the image, including both internal and external boundaries. In FIG. 1, contours 30 are indicated along the outside of the target 12, as well as, within the text of target 12. One of ordinary skill in the art will readily appreciate that image 10 includes a variety of objects, each of these objects generally has a contour. For purposes of clarity, contours associated with each of these objects are not shown.

Generally, the present invention "trains" on target 12 so that the invention will know the pattern of the item for which it is searching. During the training process, the present invention is given, or creates, a "pattern image," and the system trains on the pattern image. During the searching process, the present invention searches a "scene image" in an effort to locate the pattern that was used to train the system. For purposes of clarity, "pattern image", as used herein, means the image used in training (also referred to herein as a "learned image"), and "scene image" means the target image that is being searched for a pattern image (also referred to herein as a "target image").

Figure 2:
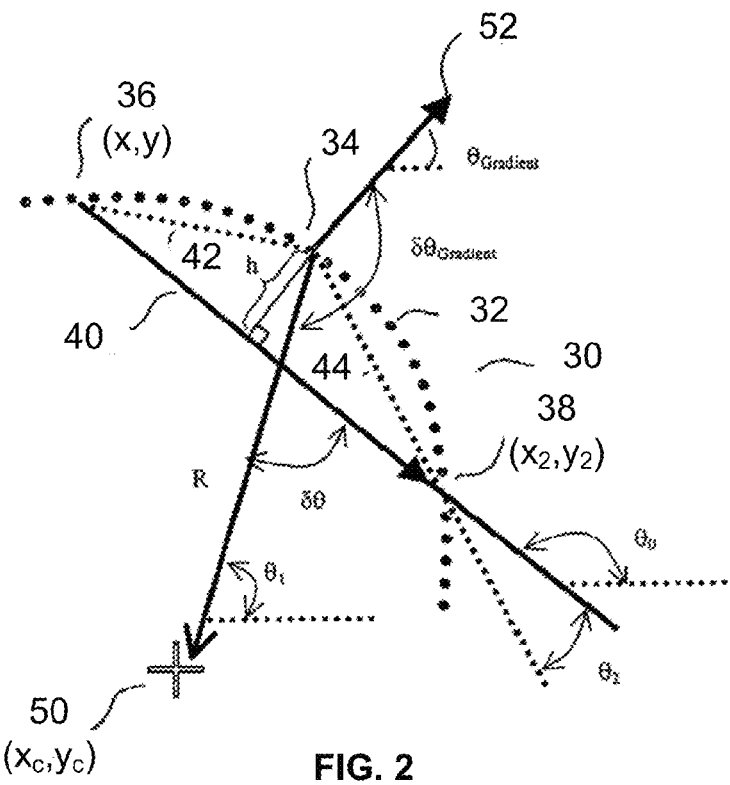
FIGS. 2-4 illustrate exemplary contours in accordance with aspects of the present invention.

FIG. 2 illustrates contour 30 that has been extracted, for example, from a pattern image during the training process and/or from a computer aided design file (e.g. CAD drawing). Referring to FIG. 2, contour 30 includes a plurality of contour points 32, which lie along contour 30. Index point 34 (located at ($x_0$, $y_0$)), which is a contour point, is selected, and two reference points, back point 36 (located at ($x_1$, $y_1$), and "behind" index point 34 by a constant k and front point 38 (located at ($x_2$, $y_2$), and "in front of" index point 34 by a constant k (not shown)) are selected. Variable k controls the locality of the curvature measurement. In one embodiment, k represents the number of contour points that separate back point 36 from index point 34, which is the same as the number of contour points separating front point 38 from index point 34. A smaller value for k gives very local curvature measurements, while a larger value for k gives more global measurements.

In one embodiment, indices of front point 38 and back point 36 may be selected automatically. In general, they are separated from index of index point 34 by k (i.e., each is k data points away from index point 34). The index of front point 38 is smaller than the index of index point 34 by k, while the index of back point 36 is larger than the index of index point 34 by k. For example, if ($x_0$, $y_0$) is at index 100, then back point 36 is the point at index 90, and front point 38 is at index 110 (for k=10).

Generally, k is chosen based upon the severity of the curves in the pattern contours and based upon the number of contour points that are used to represent the contour. Generally, a smaller k may be preferred, but k typically should not be too small. A k of 10 is sufficient in most standard applications.

Stick vector 40, which is a vector that connects back point 36 and front point 38, has a direction representing the direction of "crawl;" that is, the direction from back point 36 to front point 38. Stick vector 40 has an angle of $\theta_0$ relative to the horizontal axis.

In another embodiment, an additional back point (not shown) and an additional front point (not shown) may also be used. In general, these points may be indexed with a value greater than k. These points may be used to define an additional stick vector (not shown), which may provide additional information regarding contour 30.

Line 42 connects index point 34 and back point 36, while line 44 connects index point 34 and front point 38. Angle $\theta_2$ represents the angle between stick 40 and line 44. A distance h represents a contour curvature measure for a contour point (e.g., index point 34). The distance h is the shortest distance from index point 34 to stick 40. For example, for an appropriate k value, a value of h=0 indicates that the stick is falling on a straight line.

The "crawling" process described above is set forth in U.S. Pat. No. 7,006,964, which is hereby incorporated by reference as if fully rewritten herein. The present invention utilizes aspects of the crawling process and utilizes line (straight) segments, which conventionally were believed to be useless for visual search because they contain only limited, one-dimensional information. In one aspect of the invention, the end points of the line segments are utilized for object identification. As discussed in detail below, an end point of a line segment is a unique (salient) point in an image. The end point is also scale and rotation invariant.

Figure 3:
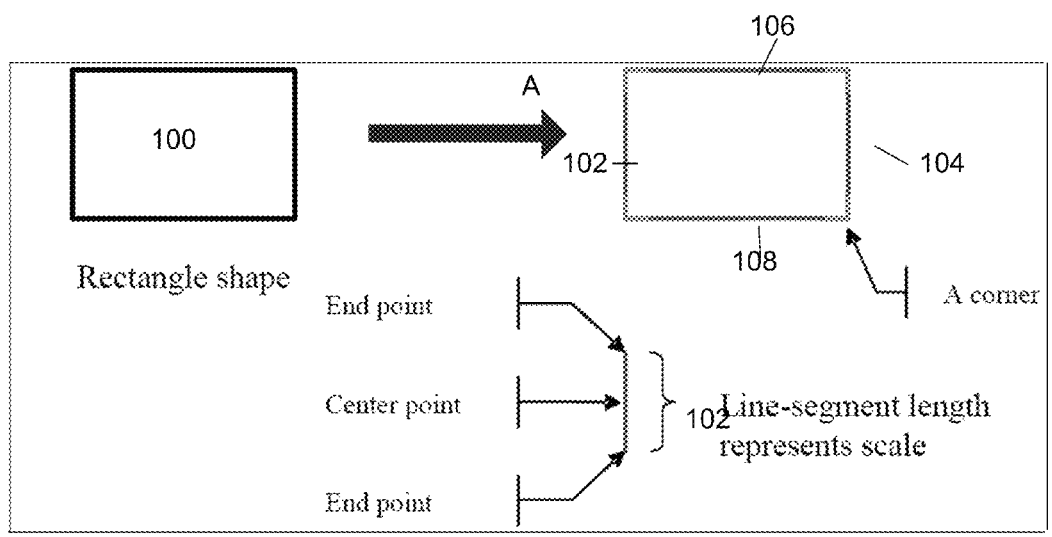

Referring to FIG. 3, a rectangle 100 is illustrated within an area A. The area A may be a viewing area, a memory, or any other suitable medium capable of representing one or more images. The rectangle 100 has four straight line segments 102, 104, 106, and 108. Each of the line segments 102, 104, 106 and 108 have ends, in most cases, and have an angle, which is simply the angle of the line with respect to some external coordinate system (discussed below). The length of the line segment (solid line) provides its scale and the center point of the line gives its location. A straight line has true and stable angle and scale that define a "characteristic" or "canonical" angle and scale.

Figure 4:
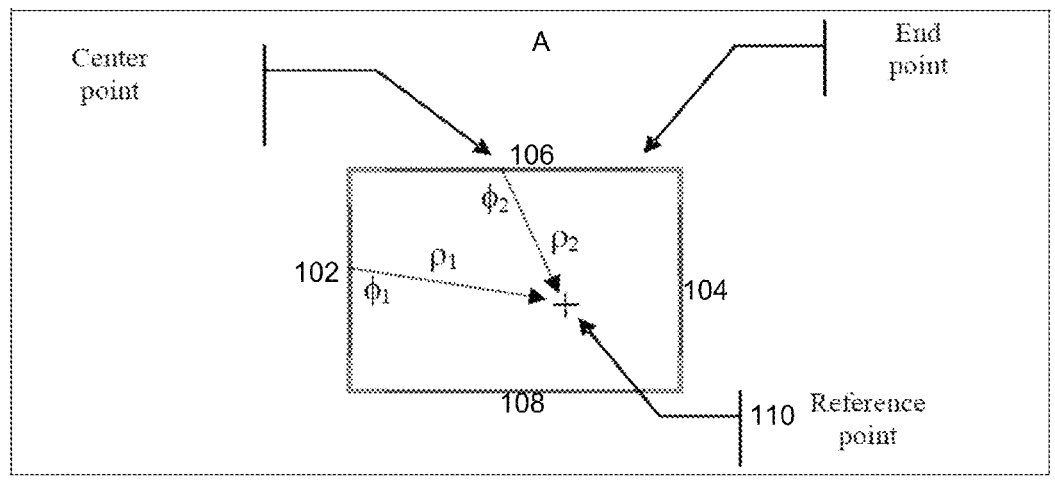
Figure 5:
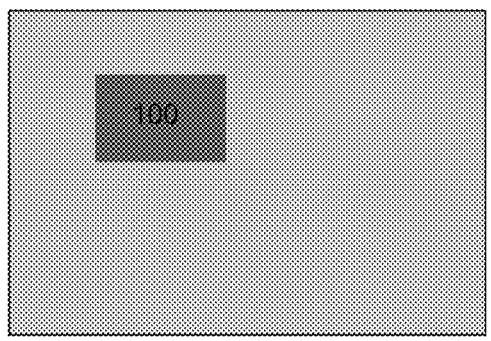
FIGS. 5-9 illustrate an exemplary method in accordance with aspects of the present invention.

For example, each of the four lines that make up a rectangle is bounded by two corners. Each bounded line gives position, orientation, and scale information, as shown in FIG. 3, to direct attention and recognize the rectangle shape regardless of the location, angle, and size of the rectangle in the image, with respect to a given reference point 110, as shown in FIG. 4.

Figure 6:
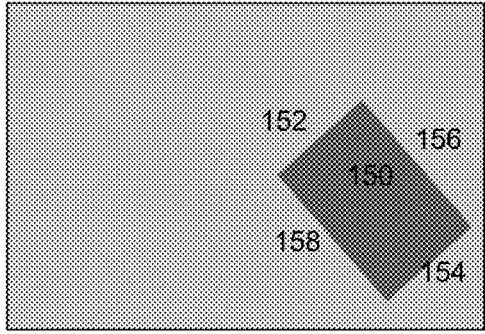
Figure 7:
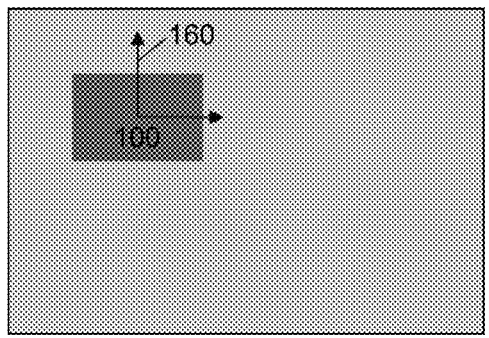

An exemplary method in accordance with the present invention is depicted by FIGS. 5-10. A simple pattern in the form of a synthetic rectangle 100 is used to illustrate aspects of the invention. The rectangle pattern 100 that is to be learned is shown in darker gray. A goal is to "train" on this shape and search for it in another image as illustrated in FIG. 6. The shape (e.g., rectangle 100) in FIG. 5 has translated, rotated and scaled by unknown factors to end up as it looks in FIG. 6 (150). As shown in FIG. 7, a coordinate system 160 is added to the rectangle 100.

Figure 8:
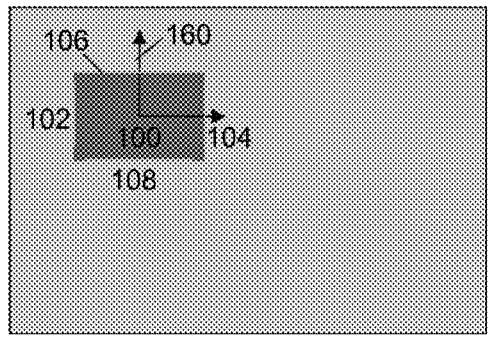
Figure 9:
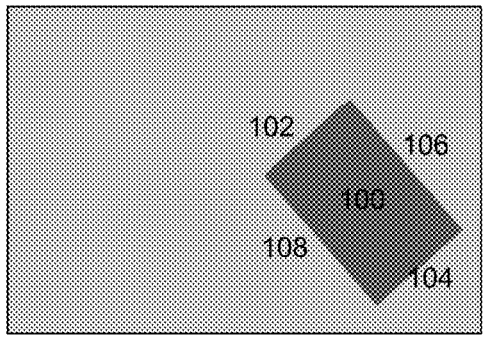

Straight-line segments 102, 104, 106 and 108 from the reference shape (also referred to as the learned image) are extracted as shown in FIG. 8 utilizing the crawling procedure discussed below. The following information is then saved for each line segment and/or image icon: contour points, endpoints, center point, line angle, and line length. A vector from each line's center point to an object reference point (user-defined coordinate system center) may also be saved. In order to search for a target image (e.g., the rectangle 150), line segments for this shape (pattern) (e.g., line segments 152, 154, 156 and 158) are extracted, as shown in FIG. 9. The extracted information is saved. Note, no reference point has been established in the target image at this juncture.

In order to match the learned object with the target object (pattern), the amount of translation, rotation, and scaling needed to transform the learned object such that its lines overlap (or its contours) the lines of the target (unknown) object are computed. The coefficients of the transform matrix give the position, orientation, and scale of the target object. In addition, the quality of the fit from learned to target is a measure of recognition and may also be saved in the transform matrix.

Figure 10A:
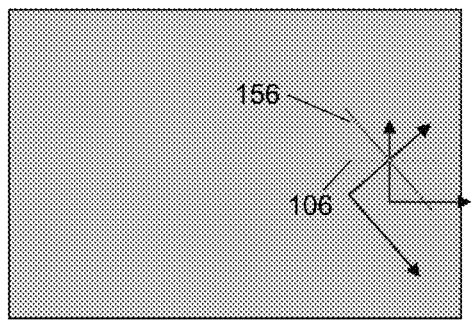
FIGS. 10A-10D illustrate exemplary translation, rotation and scaling transformations in accordance with aspects of the present invention.
Figure 10B:
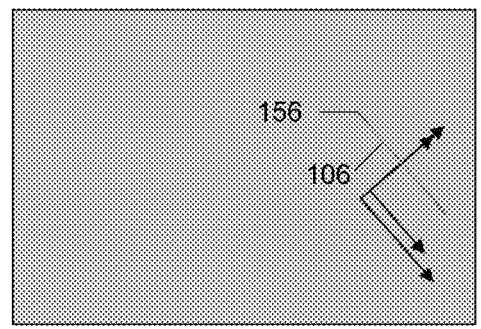
Figure 10C:
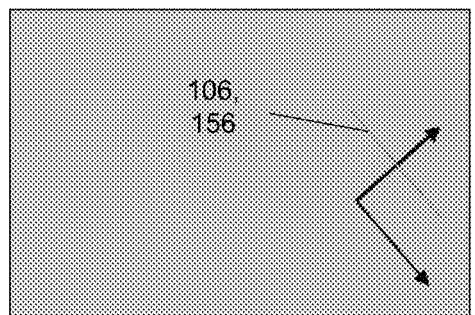
Figure 10D:
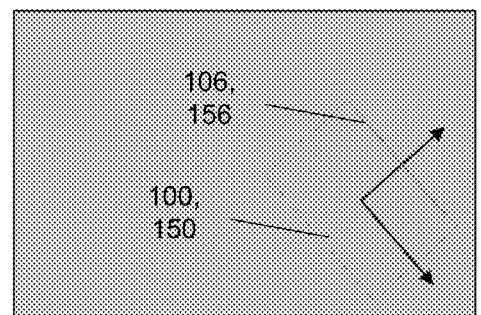

Referring to FIG. 10A, consider just the top line 106 in the trained object 100 and the longer top line 156 in the target object. To bring these two lines into alignment (1) the center of the trained object's line 106 is translated to center of the target object's line 156 (as shown in FIG. 10B); (2) the trained object's line 106 is rotated to match the angle of the target object's line (as shown in FIGS. 100), and (3) scale (stretch, in this case) the trained object's line (contour) to completely overlap with the target object's line (as shown in FIG. 10D).

If a trained-line center point is given coordinates $x_p$, $y_p$, its length is $l_p$, and its angle $\theta_p$, and for a target-line $x_s$, $y_s$, $l_s$, $\theta_s$, the transformation coefficients are:

$\delta x = x_p - x_s$, Translation in x
$\delta y = y_p - y_s$. Translation in y
$\delta \theta = \theta_p - \theta_s$. Rotation
$\delta s = l_p / l_s$. Scale The transformation coefficients form the hypothesis for recognition and location. If we apply these coefficients to the lines from the trained object (learned object) then match the lines in the target object, this validates the hypotheses that (a) the target object is a transformed version of the learned object (recognition), and (b) that the proposed transform is correct (location).

Instead of using only the straight lines in the reference (the trained pattern) and target for hypothesis verification, a set of contour points in reference and target objects are matched. This may be conceptually thought of as "overlaying" the reference object's contour points onto the target object. The quality of the fit or match quality is computed by summing the Euclidian distances between corresponding reference and target contour points. The match scores are transformed so that high match values indicate a better match, as this is used to from match scores such as correlation coefficients. Note that only few points from the contours are needed to quickly verify if a valid match based on the transform (hypothesis) from the pair of straight lines is found. In the above example, if we choose corresponding lines between the pattern and the target just to illustrate the idea. If the two lines are not corresponding lines, then the verification procedure produces low match score and a new line from the target is examined. That is, a new hypothesis (transform) is generated and verified, and so on until a high match score is found.

Only one straight line segment is generally needed from the learned image (also referred to herein as a reference pattern) to compute the transform and to find and match target objects. As shown in FIG. 6, the example target rectangle 150 has four straight lines (e.g., 152, 154, 156 and 158), any one of which can direct the "visual attention" to find the object in its new location, angle and scale. As with human vision, important features (straight lines in this method) are quickly extracted and then a second stage sequentially tests for matching patterns.

Figure 11A:
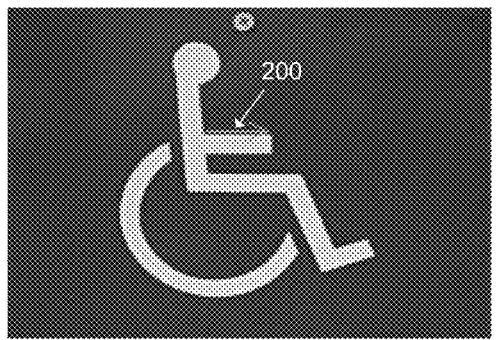
FIGS. 11A-11F illustrate an exemplary method in accordance with aspects of the present invention.
Figure 11B:
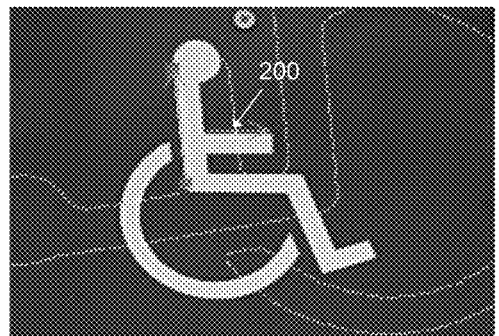
Figure 11C:
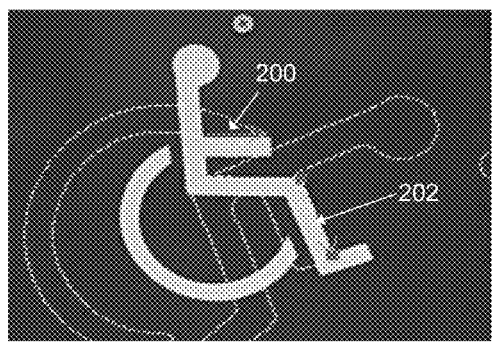
Figure 11D:
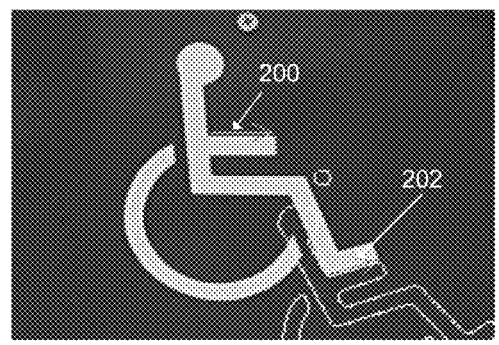
Figure 11E:
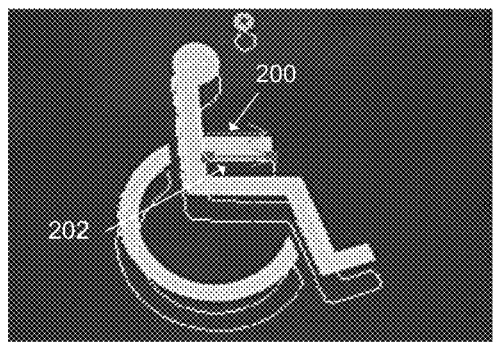
Figure 11F:
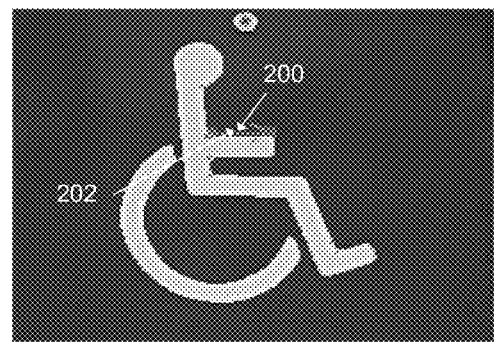

Another more complex pattern (object) being recognized and located is illustrated in FIGS. 11A-11F. In this example, the single straight line 200 is the focus of our "attention", as illustrated in FIG. 11A. Several hypotheses (transforms) 202 are generated and rejected, as illustrated in FIGS. 11B-11E, before a hypothesis is verified, as shown in FIG. 11F. As seen from the Figures, attempts to find the line 200 are made on various line segments of the target image. The hypothesis is rejected until the proper line segment 200 is found in the target image.

If a reference pattern (object) has N straight lines (also referred to herein as "icons") and the scene image has a M straight lines (lines belong to object(s) we want to recognize and locate, plus noise lines), then the cost for using one reference line as a hypothesis is 0(M) and for using all reference lines is 0(N×M). If we train on K object, then the computation cost for each hypothesis is 0(M×K) and the total computation cost is 0(N×M×K). These costs assume no prior knowledge of the transformation between two compared lines. However, we often do have a priori information that limits the range of transformations. For example, if we know that the target objects will only vary in scale with in a range of 0.5 to 2.0, then many possible pairs of line matches (transformations) can be immediately eliminated. Another way to reduce the number of hypotheses is to use additional information about the lines, such as the color difference on each side of a line, or the angle between lines. These require additional assumptions about the objects and images, but can greatly reduce the number of hypothesis that we need to test and hence the computation time.

A typical pattern contains 500 to 5000 contour points. Experimentally it has been found that 10 to 100 contour points are sufficient for rapid verification using aspects of the present invention. Once a pattern with high verification score is found then all pattern contour points are considered for final verification. The cost of the worst case scenario for rapid verification is 0(100) calculations, which is very fast and on the order of few micro seconds with modern computers.

As used herein, the gradient angle of straight line is the average gradient angle of contour points that make up that line segment. The gradient angle may be computed from the direction of the image intensity gradient at each contour point. Thus a line angle based on gradient information can range from $-\pi$ to $\pi$. Without gradient information, it is difficult to determine the "direction" of the line so angles range from only $-\pi/2$ to $-\pi/2$. Thus, gradient information is generally needed in order to get the correct angle for the transformation hypothesis. Otherwise, there is a need to test the hypothesis for 2 angles $\theta$ and $\theta+\pi$, which effectively doubles the search time.

As stated above, only one line segment from a pattern is generally needed to search for matching target objects. However, if the corresponding line in the target is occluded or corrupt, then no match may be found. It has been found that for practical purposes, using five lines from the reference pattern provides robust results. The criterion for choosing these five lines is simply to pick the five longest lines in the reference pattern. The rationale for this approach is that longer lines provide more accurate transformations. With five lines, we have sufficient redundancy to make this method robust.

An end point of a line is a unique (salient) point in an image. An end point is scale and rotation invariant point. The size of a line segment provides a true scale (size) of that point and the orientation angle provides the angle of the point. Therefore, we can extract image patches (also referred to as icons) centered at the end point, the size of the image patch is the scale (the line length) or a factor of the line length. The angle of the line is the orientation for which the patch is extracted. The image patch becomes rotation and scale invariant patch. Learned object (pattern) comprises lines and patches. During the search phase, the image patches of the learned object are compared for similarity with image patches of unknown object(s). Matched pairs suggest that the end points are corresponding point. A verification process is then performed. This method allows for fast recognition of multiple learned objects.

Figure 12:
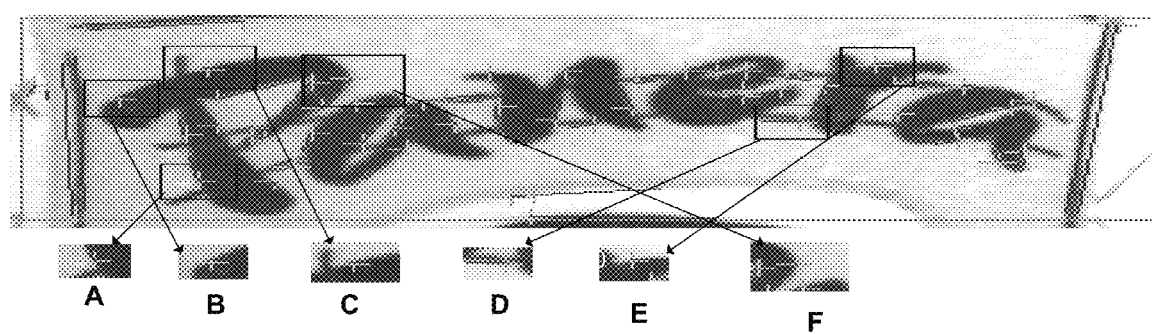
FIG. 12 illustrates an exemplary learned image and learned image icons.

FIG. 12 shows a pattern and examples of image patches. Each patch (also referred to herein as "icon") (e.g., A-F) corresponds to a line segment extracted from the learned image (e.g. Panera sign). Each patch can be converted into a vector with means such as principle component analyses. Indexing techniques can be used to match an image patch with a data base of image patches that belongs to trained objects.

Thus, aspects of the present invention relate to methods that can perform practical visual searching using straight line segments provided in a target image and a learned image in a fast and highly accurate manner.

In one aspect, Curvature-Based Straight Line Extraction (CBSLE) is utilized to extract straight lines from images. One of ordinary skill in the art will appreciate that any method of extracting lines from images may be used in accordance with aspects of the present invention. However, the CBSLE method has been shown to be very efficient for detecting linear patterns and/or features in images.

The CBSLE method is now discussed in detail. The curvature at a point on a curve is defined as the change in tangent, θ, with respect to distance, s, along the curve:

$$K = \frac{\delta \theta}{\delta s}$$

Figure 13:
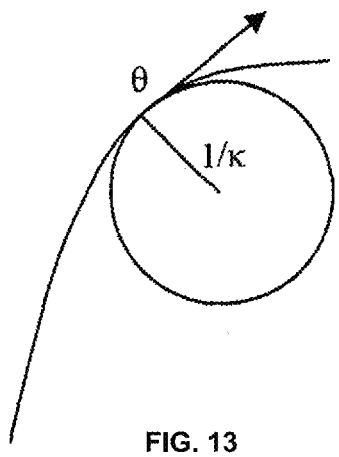
FIGS. 13-16 illustrate an exemplary method in accordance with the aspects of the present invention.
Figure 14:
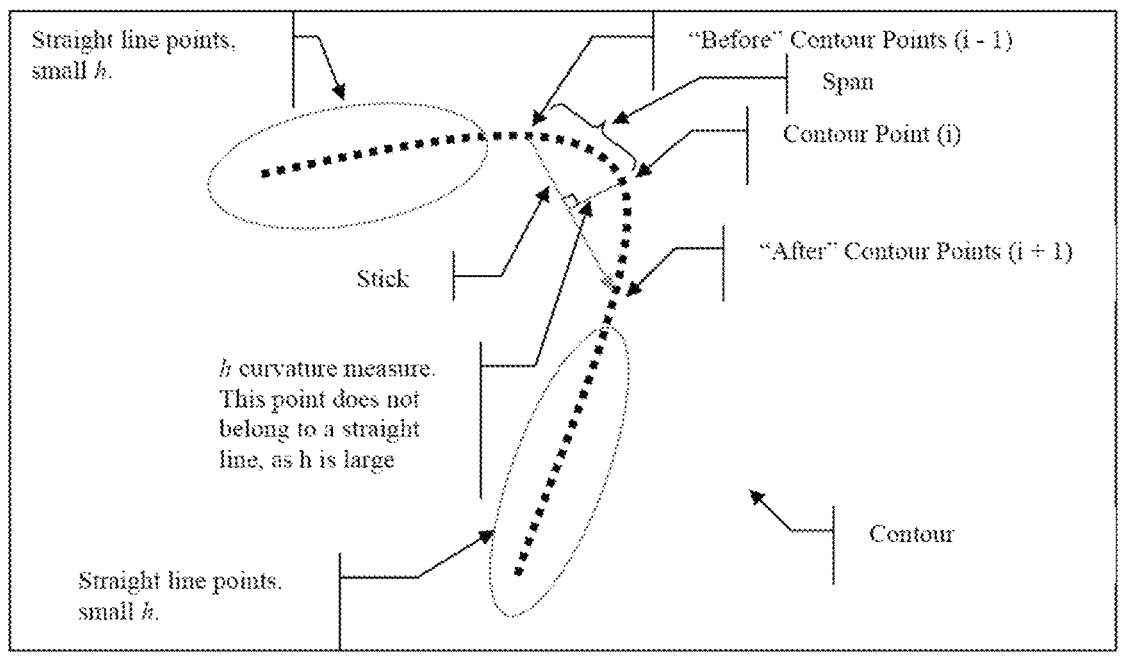
Figure 15:
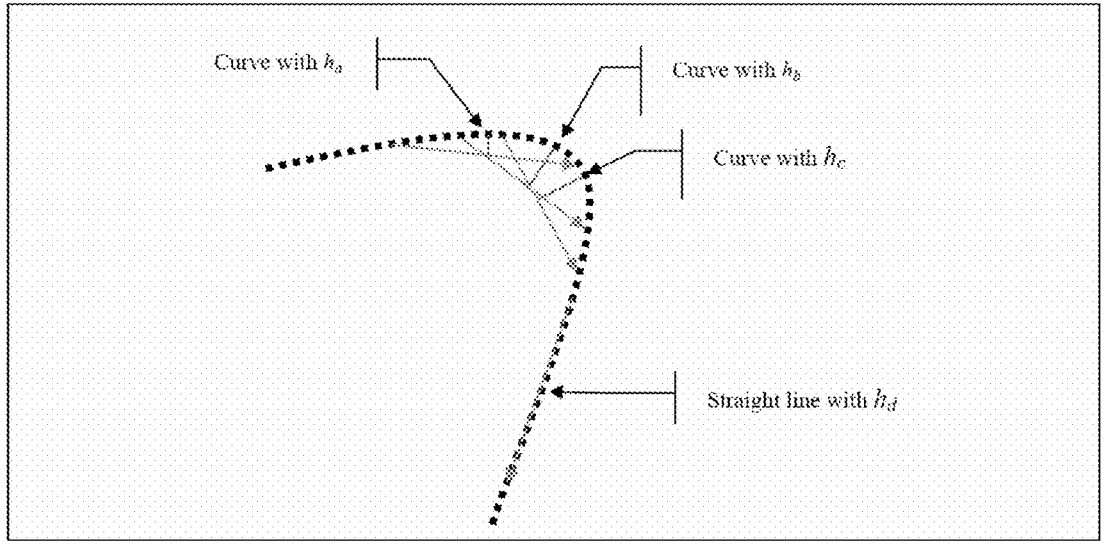

A contour point is considered to belong to a straight line if its curvature value is near zero or the osculating circle's radius, 1/K, is large. A measure of curvature may be computed by the perpendicular distance, h, between a contour point and a virtual line (called a "stick") that spans between "before" and "after" points as shown in FIGS. 13-15. The number of contour points between the chosen contour point and the "before" and "after" points is the same, and is called the "span". h is a scale dependent measure of curvature on quantized curves. It approximates the analytic definition of curvature as the span distance decreases. Quantization and noise in digital images prevents the use of small spans (scales). Instead, aspects of the present invention allow the span to be a free parameter that sets the scale of measure, where larger spans "average out" more details of the digital curve.

Adjacent contour points with small curvature are grouped to form straight-line segments. The points in each straight-line segment are then fitted to an analytic straight line (y=mx+b) using linear regression. Each straight line segment consists of its individual edge points and an equation (y=mx+b) where the slope, m, is the orientation of the line. The mid-point of the segment is the average value of the segment's end points, and is taken as the line position. An exemplary computation for h is as follows:

$$\delta x_i := x_{1+span} - x_{i-span}$$

$$\delta x_i := x_{1+span} - x_1$$

$$\theta_i := a\tan 2\lfloor \delta_{xi}, (-\delta y)_i \rfloor$$

$$\alpha_i := \theta_i - \lambda_i$$

$$h_i := side\_length_i \cdot \sin(\alpha_i)$$

$$\delta_{yi} := y_{i+span} - y_{i-span}$$

$$\delta_y 1_i := y_{i+span} - y_i$$

$$\lambda_i := a\tan 2\lfloor \delta x 1_i, (-\delta_y 1)_i \rfloor$$

$$side\_length_i := \sqrt{(\delta x 1_i)^2 + (\delta y 1_i)^2}$$

$h_i$ is the h vbalue for a contour point at index i, $x_i, y_i$ is the contour point being tested for belonging to a straight line.

Figure 16:
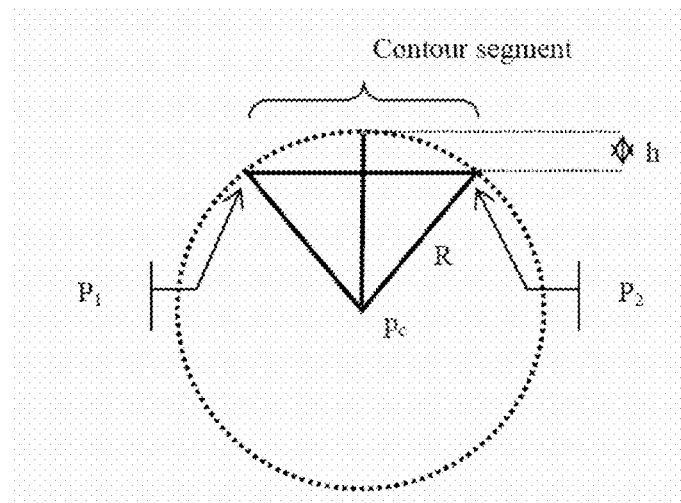

If we approximate a small contour segment with circular arc then, as shown in FIG. 16, then:

$$\left(\frac{s}{2}\right)^2 + (R-h)^2 = R^2$$

Solving for R:

$$R = \frac{1}{8} \cdot \frac{s^2 + 4 \cdot h^2}{h}$$

Then the curvature k is equal to:

$$k = \frac{8 \cdot h}{s^2 + 4 \cdot h^2}$$

This shown that in the limit, h is sufficient to computer curvature.

An exemplary algorithm to extract line segments using the h method is as follows:

Step I
  Extract contours using an edge detector such as [Canny, 1986]
  Select a span, n, to set the scale of measure
  Select a threshold value for calling a curve straight
  Loop: "crawl" each contour in the object
    Loop: for every contour point $cp_i$ in a contour
      Get $cp_{i-n}$, $cp_{i+n}$
      Compute h, as above
      If h < threshold value
        Mark $cp_i$,
      End
    End
Step II
  Loop: for every contour in the object
    Loop: for every contour point marked in Step I
      Collect and save connected marked points as a single line segment.
      End
End
Loop: for each line segment
    First and last points are the ends of the segment -continued

```
    Average of first and last points are the center (location) of the
    segment
    Least square fit points in the segment to compute m, b for y = mx +
    b.
    Compute average gradient angle of all contour points
    (line orientation)
End
```

The following information is then available for each line segment in the image:
Pend_a=the first end point of line segment (from the direction of crawl)
Pend_b=the last end point of line segment (from the direction of crawl)
Pcenter=the center of line segment=(Pend_a+Pend_b)/2.
$P_i$=contour points in this line segment
AveGradAngle=the average angle of contour points $-\pi$ to $\pi$.

Figure 17:
FIGS. 17 and 19 illustrate edge extraction lines in accordance with aspects of the present invention.
Figure 18:

The AveGradAngle is generally computed from the slope of the line and the direction of the intensity gradient along the line. The slope provides angle defined from $-\pi i/s$ to $\pi/2$ but AveGradAngle has a range $-\pi$ to $\pi$. AveGradAngle is generally needed to get the proper transform coefficients. FIGS. 17 and 18 are exemplary illustrations of line segments being extracted from images using the CBSLE algorithm.

Figure 19:
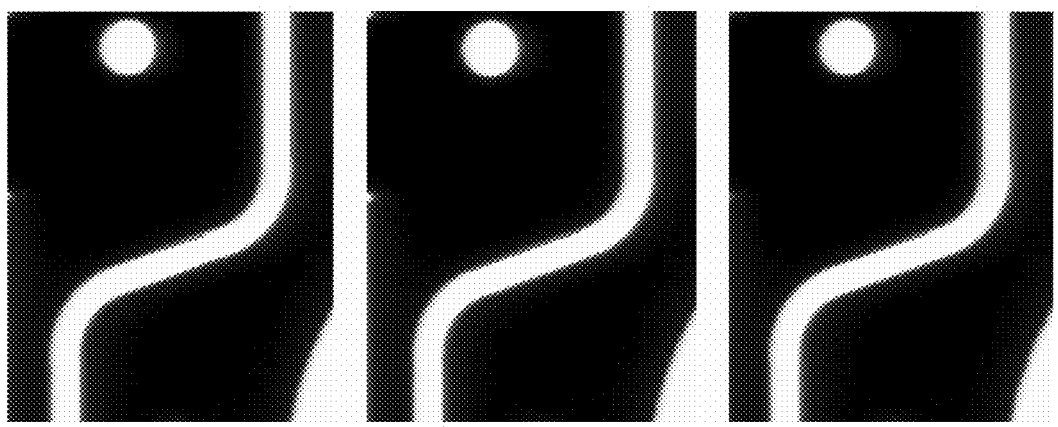

The "span" value is the number of contour points (pixels) to go "backward" or "forward" from a contour point that is being examined for curvature. The length of the span (the number of pixels in the arc) sets the scale of measurement. As the length of the span increases, details—higher spatial frequencies—of the curve are generally lost. In a sense, the span acts as a low pass filter to reduce digital noise and to set the scale of measurement. Longer span values will cause the algorithm to miss short line segments, and shorter span values will increase the number of short line segments found in a slowly curving contour. In practice, a span of three pixels (7 contour points from beginning to end of the contour segment) has been found to work with most contours. Changing the span value effects the locations of the ends of a line segment. FIG. 19 shows how the straight line segments "slide" as the span value varies.

Once the crawling process is completed, hypothesis generation is performed. A straight line segment (the reference line) from the reference pattern (also referred to as the learned image) is compared to target lines from the target pattern or scene. The transformation required to match the reference line to the target line is the hypothesis that the reference line and target line represent the same line feature in an object or pattern that has been translated, rotated and scaled. The hypothesis is nearly an affine transform.

The following is exemplary transformation code fragment used to generate the hypothesis:

```
// COMPUTING SCALE
// Scale is scene line-length divided by pattern line -length.
    scale = aSceneLine.length / aPattLine.length;
//COMPUTE ROTATION
    rotation = aPattLine.trueTheta - aSceneLine.trueTheta;
// //COMPUTE TRANSLATION
    translationX = aPattLine.xmid - aSceneLine.xmid;
    translationY = aPattLine.ymid - aSceneLine.ymid;
// COMPUTING SCENE PATTERN LOCATION
// Translate the mid-point-pattern to mid-point-scene, rotate about the
scene
// mid-point and compute where the scene pattern point is.
    SceneRefX = (xref translationX - aSceneLine.xmid)*cos(rotAngle) -
(yref - translationY - aSceneLine.ymid)* sin(rotAngle) +
aSceneLine.xmid;
    SceneRefY = (xref - translationX -
aSceneLine.xmid)*sin(rotAngle) + (yref - translationY -
aSceneLine.ymid)*cos(rotAngle) + aSceneLine.ymid;
// Scale it.
    SceneRefX = (SceneRefX - aSceneLine.xmid)*scale +
    aSceneLine.xmid; SceneRefY = (SceneRefY -
    aSceneLine.ymid)*scale + aSceneLine.ymid;
```

The above steps can be reduced as follows:

```
scale = aSceneLine.length/aPattLine.length;          //Scale
rotation = aPattLine.trueTheta - aSceneLine.trueTheta;  //Rotation
// Compute translation
double costrans = cos(rotation) * scale;
double sintrans = sin(rotation) * scale;
double X = (xref - aPattLine.xmid);
double Y = (yref - aPattLine.ymid);
xScene = X*costrans - Y*sintrans + aSceneLine.xmid;
yScene = X*sintrans + Y*costrans + aSceneLine.ymid;
```

During the search phase for the target object, the hypothesis generating algorithm selects (attends to) a line from the reference pattern (starting with the longest straight line of the pattern) to compare to a line from the scene (also starting with the longest line). This comparison suggests a transformation hypothesis that could map the reference pattern to the target pattern. Then this hypothesis is verified and accepted or rejected, as discussed below. If rejected, another hypothesis is generated and verified, and so on until the hypothesis is accepted.

In current implementation, the only constraint applied during hypothesis construction is the length of the line. This is done first by starting the hypothesis generation from the longest lines and working towards shorter lines, and second, if the ratio of the lengths of the reference and target lines is outside expected range, then that line is skipped. These two constraints are quite minimal. Stated another way, the methods disclosed herein generally assume very little about the structure of the reference and target patterns. Adding constraints to selecting line pairs could greatly reduce the number of hypotheses that have to be verified, but at the expense of assuming more about the objects being recognized and located. Some other exemplary constraints that could help reduce the number of hypotheses include:

1. In color images, use the average color difference across the line as a "label" or tag for selecting lines for hypothesis generation. This is probably a trick used by human vision.
2. Create a line profile (graph of gray-level pixel values) that is the perpendicular bisector of the straight line. Find the extremum (brightest point) in the profile and use the distance between the straight line and the extremum (along the line profile) as a "label" or tag for selecting line pairs for hypothesis generation. The extremum could be computed by any of the methods suggested by [Brady & Kadir], [Tuytelaars &Van Gool], or [Tell & Carlsson].
3. In analogy with search methods proposed by Schmid, Lowe, and Brady, use the entire line profile (as described in 2. above) as the "descriptor" or "key" to use for searching in a data base for matching lines.

An object is defined purely as contours (connected sets of edge points) at initial location, angle and size (scale, uniform scale). When an object translates, rotates, or changes in size, only its contours move. This is unlike other methods that use image areas to define an object.

The verification module takes a transformation hypothesis and applies it to the reference pattern to overlay the pattern on the target edge image. The edge image, as computed by the Canny operator, has only edge points, not contours (connected sets of edge points). The verification then computes the match in the fit of the transformed contour points and the target image edge points. A high match score supports the hypothesis that the target pattern is a transformed version of the reference pattern.

The verification process in pseudo code is as follows:

```
Set a distance threshold, n (typically 6 or 7)
Match Score = 0
Initialize a Score LUT, of size n
Loop: For all points, p, in the reference contours
    Find the distance along the gradient direction, d, from contour point, p, to a target edge point.
    If d n then Match Score += Score LUT(n)
End
```

The values of the Score LUT (Look-Up Table) are empirically determined, typically:

| Distance, d | Resulting Score |
| --- | --- |
| 1 | 1.00 |
| 2 | 0.99 |
| 3 | 0.98 |
| 4 | 0.94 |
| 5 | 0.90 |
| 6 | 0.86 |
| 7 | 0.80 |

The scores fall off more rapidly as d increases in the LUT. The Match Score thus is larger, the closer the distance between the reference object's contour points and the target's edge points. The Match Score is generally scaled by dividing it by the total number of points in the reference object's contour points, to give a percent match.

Aspects of the present invention relate to initially using a small number of pattern contour points—about 10% is sufficient—to quickly test for a possible match. Once a possible match is found (a match score above 80%), the verification is repeated on the entire set of contours to get a more accurate score for this reference object and transformation hypothesis. One of ordinary skill in the art will readily appreciate less than the entire set of contours may be used to determine a match and/or verification.

A final step is used to exactly match the location and scale of the transformed pattern with the target pattern. While the angle estimate is precise due to the least squares line fit, the location has about 5 pixel error and the scale has about 10% error. To reduce this error to a fraction of a pixel, I use a simple hill climbing approach to "zero in" on the location and scale. The hill climbing method searches for a higher match score by stepping left, right, up and down by 2.5 pixels and by enlarging and reducing (scaling) by 5%. If a better position and scale is found, the step size for the position and scale are halved and the search repeated until no improvement is found. This very quickly reaches a match that is within 0.078 pixel in position (less than 1/10 of a pixel) and within 0.078% of the best scale.

Figure 20:
FIG. 20 is an exemplary application in accordance with aspects of the present invention.

FIG. 20 shows verification attempts and the closest match, which then has to be "zeroed in" by the hill climbing algorithm. In fact, comparing the intersection points of two pairs of lines from the reference pattern and corresponding target lines would eliminate the need to hill climbing.

Figure 21:
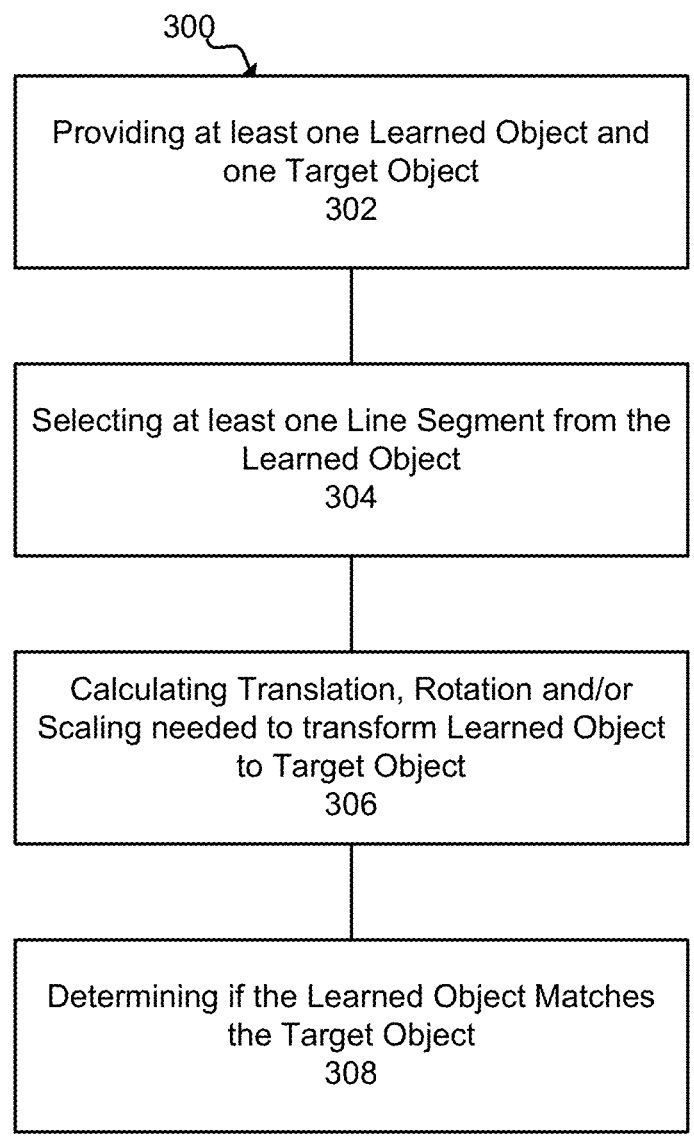
FIGS. 21-24 are exemplary methods in accordance with aspects of the present invention.

FIG. 21 illustrates an exemplary method 300 in accordance with aspects of the present invention. The method 300 is useful for matching a learned object with a target object. At step 302, at least one learned object and at least one target object are provided, wherein the learned object and the target object include at least one line segment. One of ordinary skill in the art will appreciate that the learned object may be previously learned and stored in any suitable electronic format. At step 304, at least one line segment from at least one learned object is selected. At step 306, the amount of translation, rotation, and scaling needed to transform the line segment of the learned object to have one or more lines substantially the same size as lines on the target object are calculated. At step 308, it is determined if the learned object matches the target object.

Figure 22:
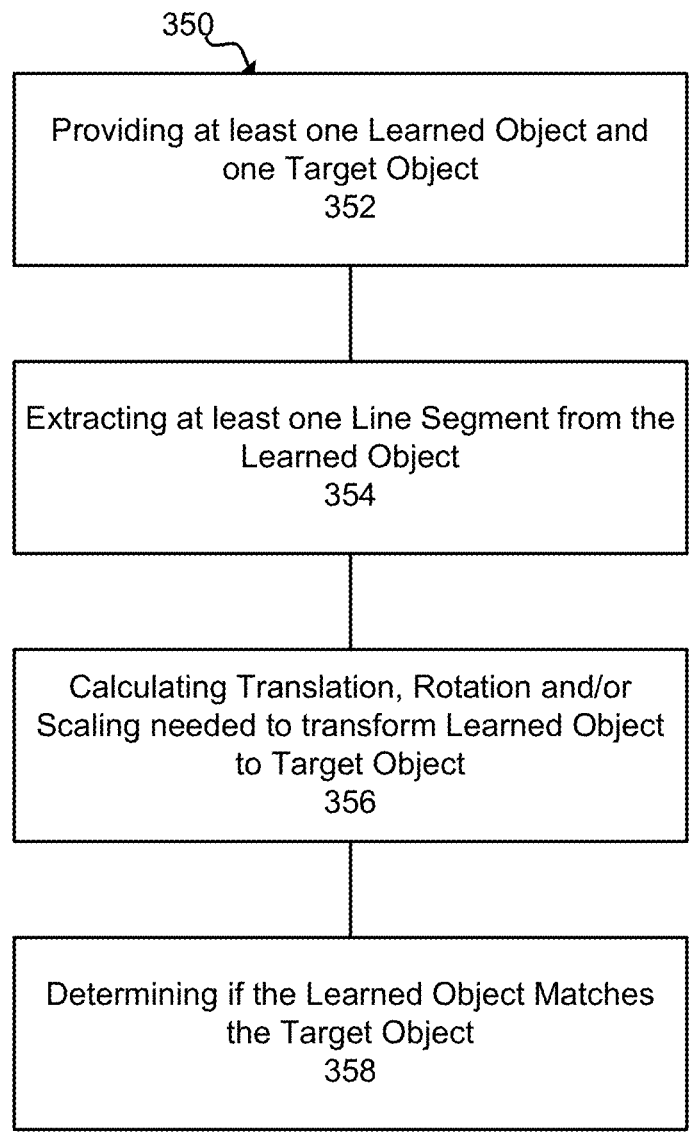

FIG. 22 illustrates an exemplary method 350 for matching a learned object with a target object. At step 352, at least one learned object and at least one target object is provided, wherein the learned object and the target object have a plurality of contour points. The contour points having a curvature below a certain threshold value are grouped together to form at least one line segment. At step 354, at least one line segment is extracted from the learned image. At step 356, the amount of translation, rotation, and scaling needed to transform the line segment of the learned object to have one or more lines substantially the same size as lines on the target object is determined or otherwise calculated. At step 358, a determination is made as to whether the learned object matches the target object.

Figure 23:
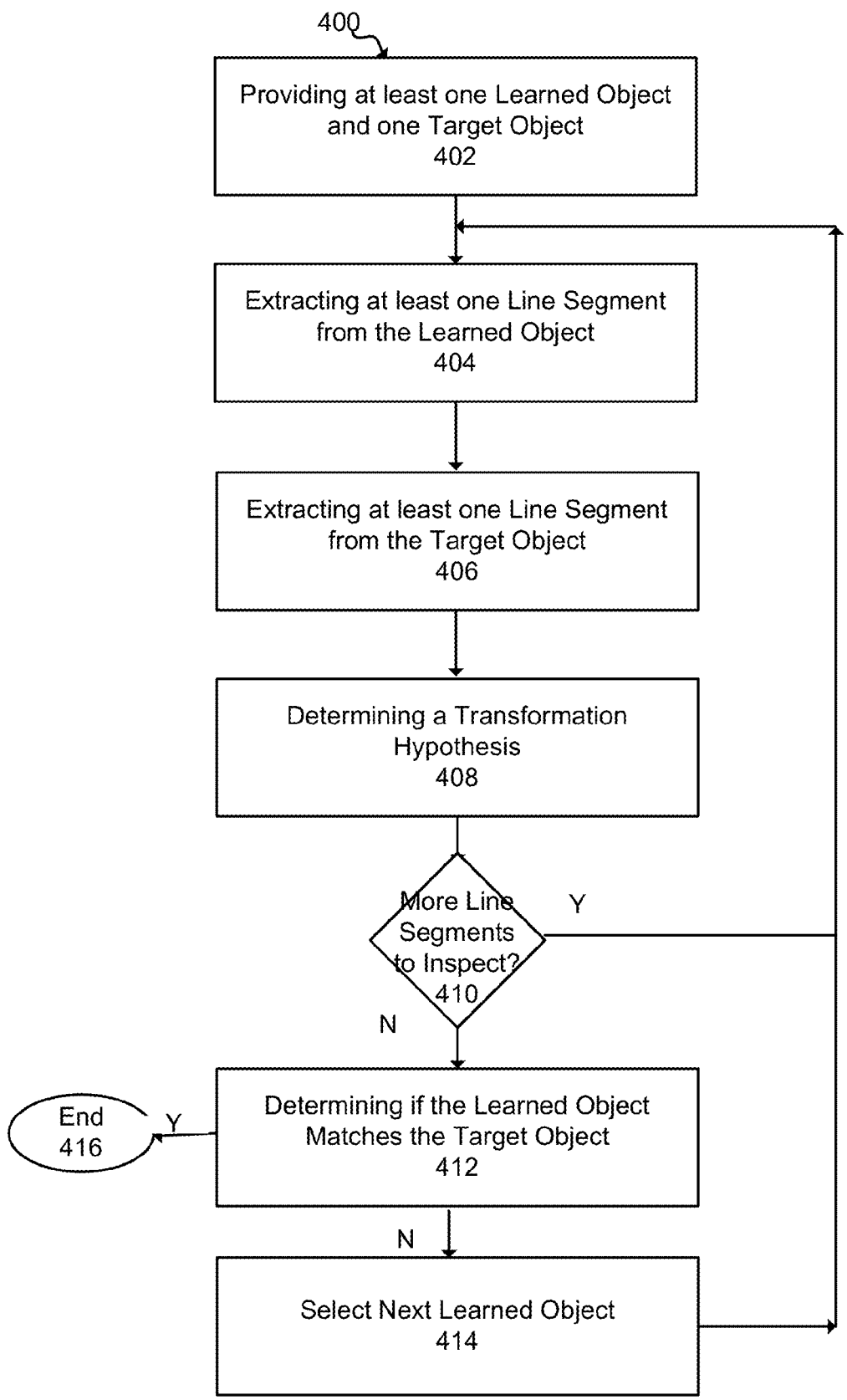

FIG. 23 illustrates an exemplary method 400 for matching a learned object with a target object. At step 402, at least one learned object and at least one target object is provided, wherein the learned object and the target object have a plurality of contour points, wherein contour points having a curvature below a certain threshold value are grouped together to form at least one line segment. At step 404, at least one line segment from the learned image is extracted, wherein the selected line segment corresponds to a longest line segment of learned image. At step 406, at least one line segment is extracted from the target image, wherein the selected line segment corresponds to a longest line segment of the target image. At step 408, a transformation hypothesis is determined that maps the learned image to the target image. At step 410, a determination is made to see if there are any other line segments to inspect. Generally, the next longest line segment from the learned image and the target image is selected. If the determination result is positive, steps 404 through 410 are repeated. If the determination is negative, at step 412, a determination is made if the learned object matches the target image. If the learned object matches the target object the method 400 terminates at step 416. If the learned object does not match the target object another learned object is selected and steps 404 through 410 are repeated.

Figure 24:
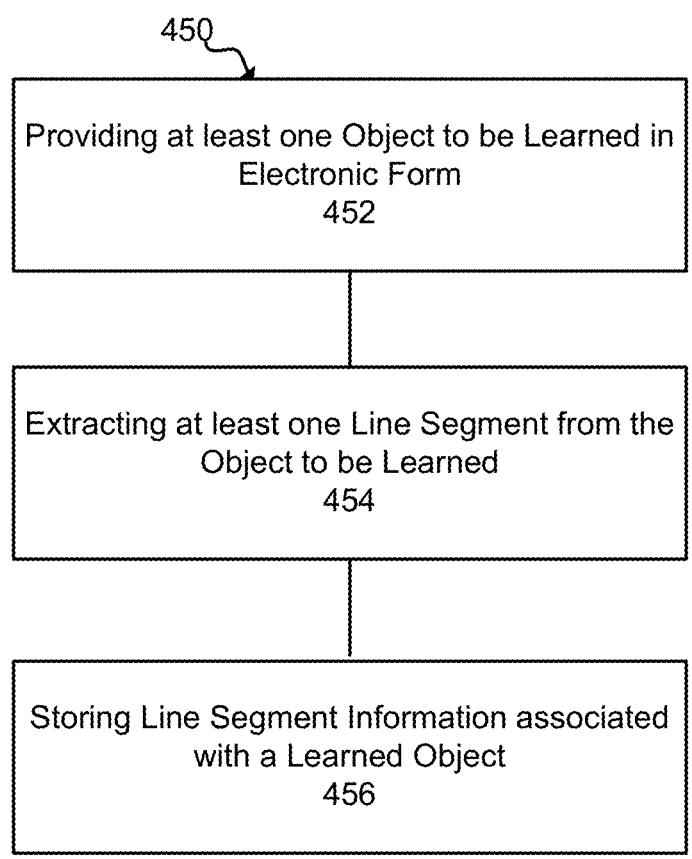

FIG. 24 illustrates another exemplary method 450 for learning an object. The method 450 includes at step 452 providing an object in electronic form, wherein the object includes at least one linear feature formed by a plurality of contour points. At step 454, at least one icon is extracted from the object. The icon generally includes at least one end point associated with the linear feature. The icon generally has a size determined by a distance between an end contour point and the one end point, wherein the end contour point is an outermost contour point from a series of contour points having a curvature below a curvature threshold value in from the one end point. The icon is scale and rotation invariant. At least one icon is extracted for all linear features of the object having a segment length above a length threshold value. An analytic line may be fit on the line segment using linear regression for representation of the icon. The analytic line may utilize the end point associated with the linear feature and the end contour point. At step 456, information extracted and/or otherwise calculated that is related to the icon(s) may be stored in a database of icons.

Figure 25:
FIGS. 25-32 are exemplary applications in accordance with aspects of the present invention.

An application of aspects of the present invention is illustrated in FIG. 25. The top four images are from the same scene and the bottom two images are from different scenes. The images are taken at different distances from the stop sign and to show a range of sizes (scales) from 1.0 to 2.3. The stop sign in the top left image is used as the reference (training) pattern (scale=1.0). This pattern is 78×78 pixels, but any size is suitable. The illustrated images are 640×480 pixels. These scenes have many objects with lots of straight lines. In these busy images, the algorithm recognizes and locates the stop sign.

Figure 26:

FIG. 26 shows a similar exemplary type of street scene as in FIG. 25, but for a "Talbots" sign. The reference pattern size is 280×142 pixels and the scene images are 640×480 pixels. The "Talbots" signs have a size range from 1.0 to 0.52 times. The learned object is the top left image. The algorithm recognizes and locates the "Talbots" sign.

Figure 27:

FIG. 27 shows the back of a truck, moving on the highway in a foggy day. This test demonstrates the feasibility to use this algorithm in an unmanned vehicle convoy. The algorithm "locks" onto the writing on the truck and tracks it. The scale range for these images was from 1.0 to 0.55. The pattern size for these images is 231×135 pixels.

Figure 28:
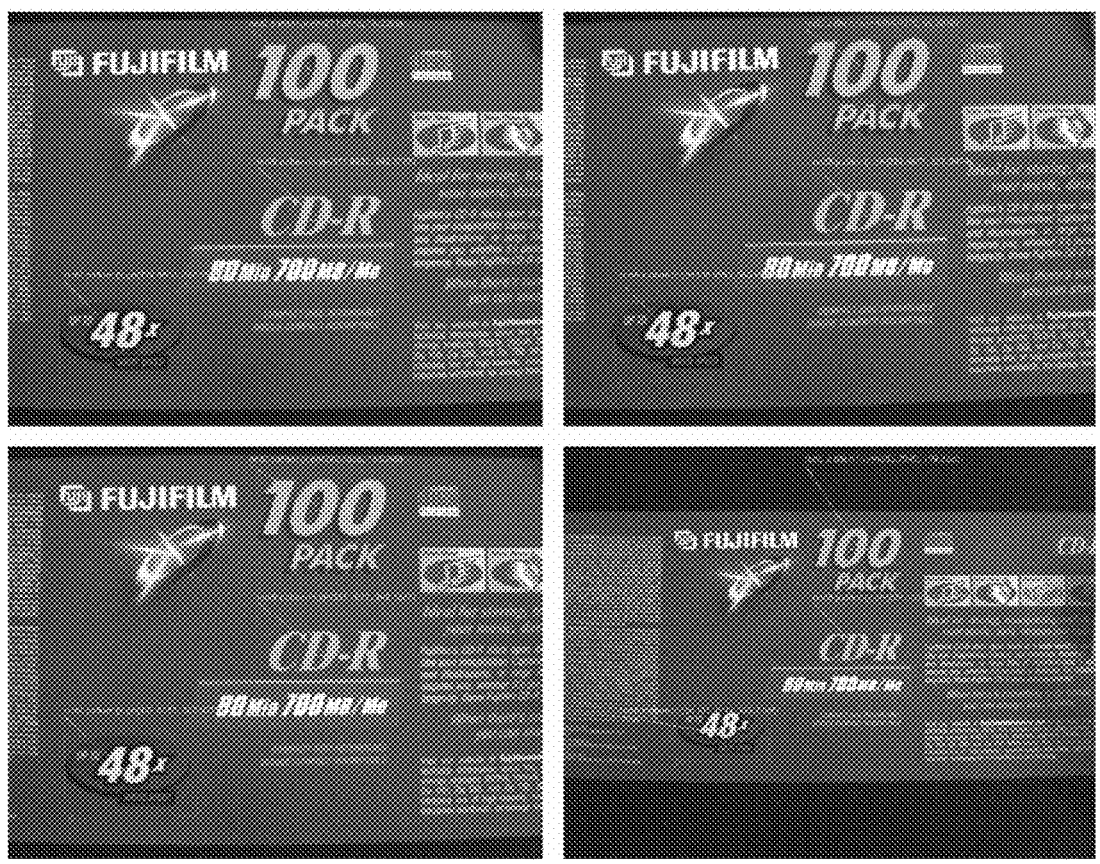

FIG. 28 shows images of label on a package of CD-R disks. The label images show some translation and rotation but mostly changes in scale. This test shows that, using this algorithm, you can teach on one type of label and search for similar label but on different product with a different size. Three independent patterns from the label were trained and searched on the entire image. There are very few straight lines in these images but the algorithm performed well.

Figure 29:

FIG. 29 shows lanes on the highway. This Figure illustrates how the CBSLE algorithm might be used for lane tracking. The straight line extractor takes 41 milliseconds on these 640×480 images (using a 2 GHz, Pentium III laptop). This means this algorithm could be used to track lanes at about 20 images (samples) per second.

Figure 30:
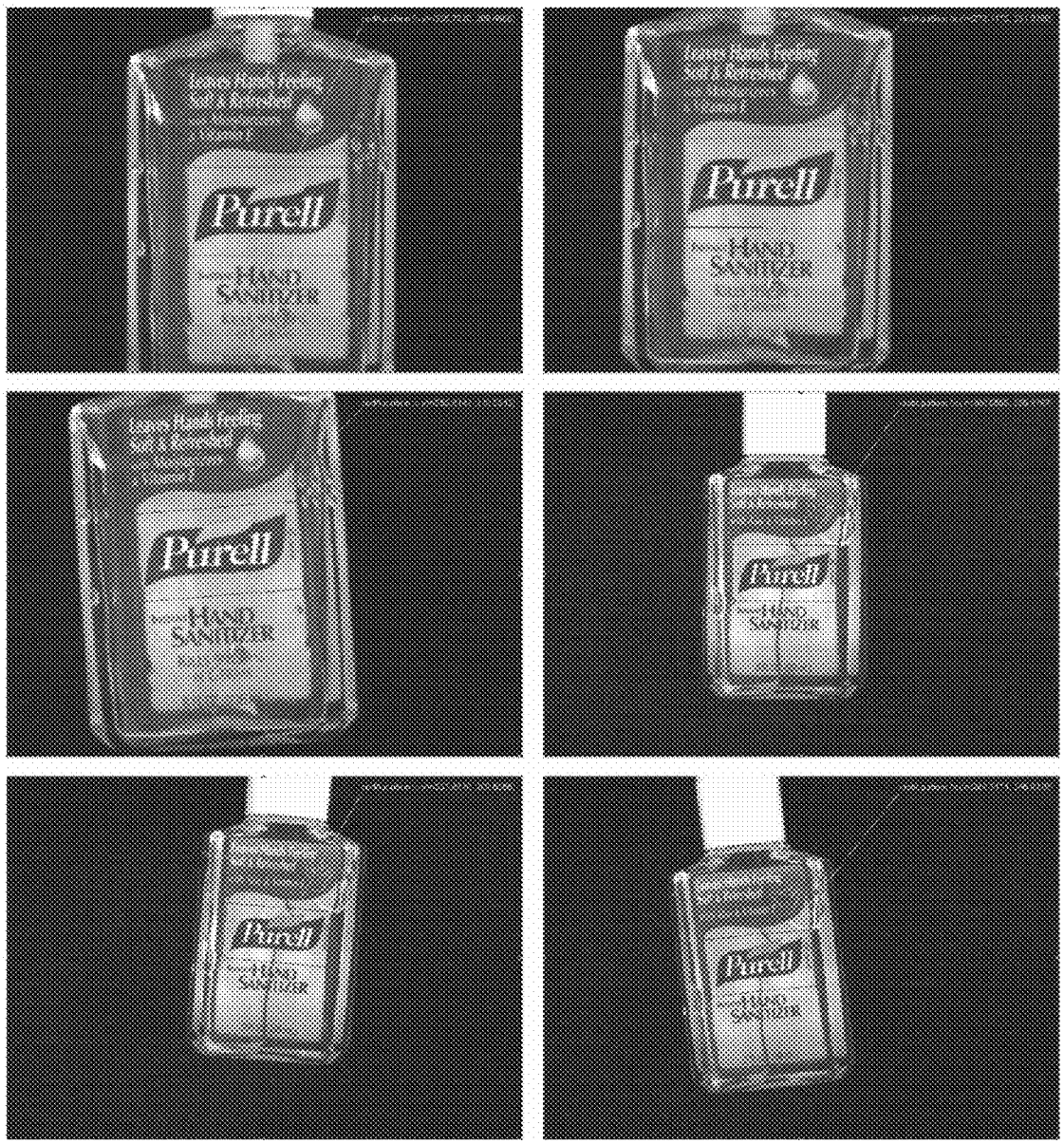

FIG. 30 shows labels on various bottles. The algorithm has no difficulty recognizing the logo, even though the bottles in the first three images are physically larger than in the last three. Using this algorithm could eliminate the need to train on individual product types.

Figure 31:
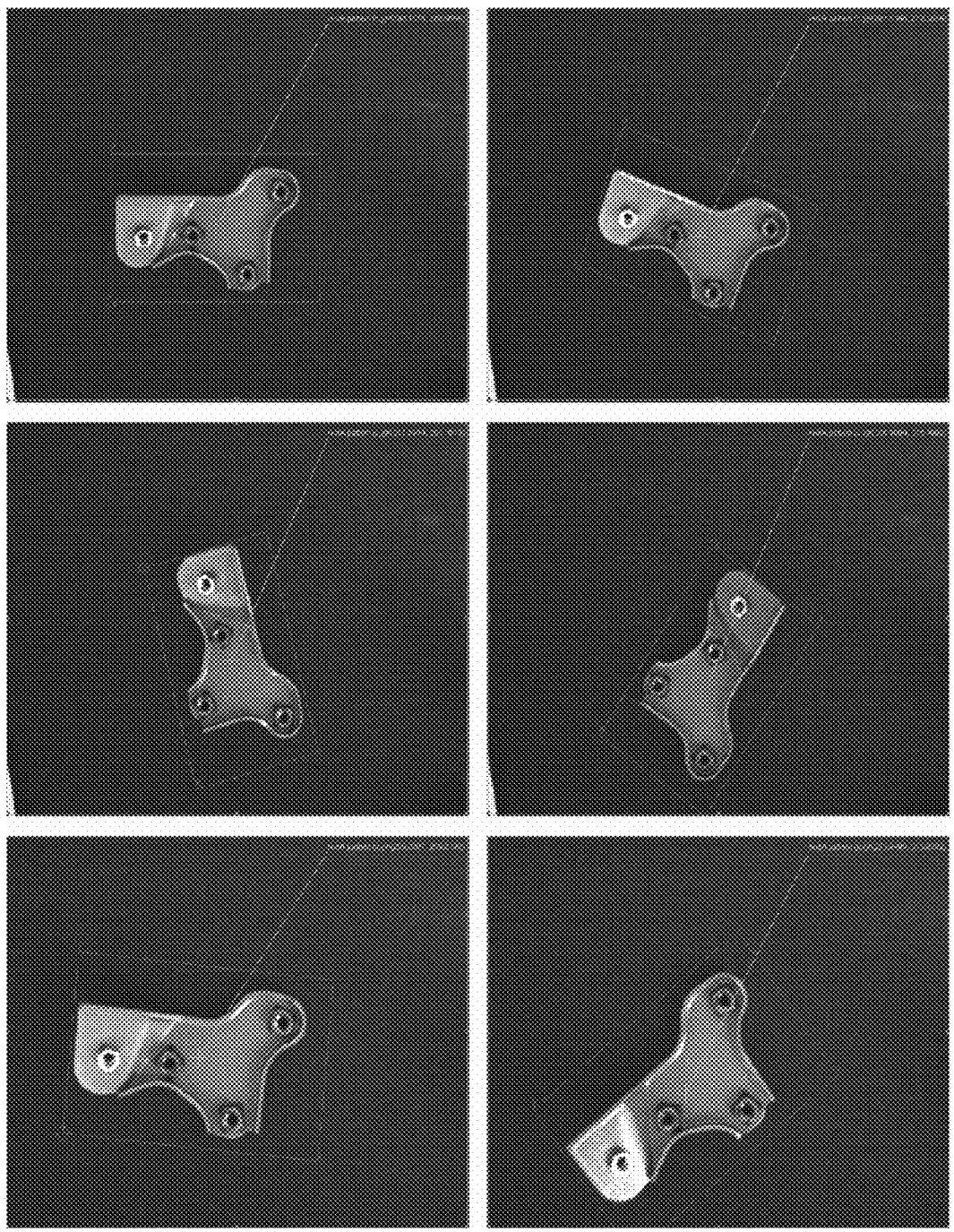

FIG. 31 illustrates an image of a metal bracket, as it might be presented on a conveyer belt. The algorithm successfully locates the bracket regardless to its orientation angle and size.

Figure 32:
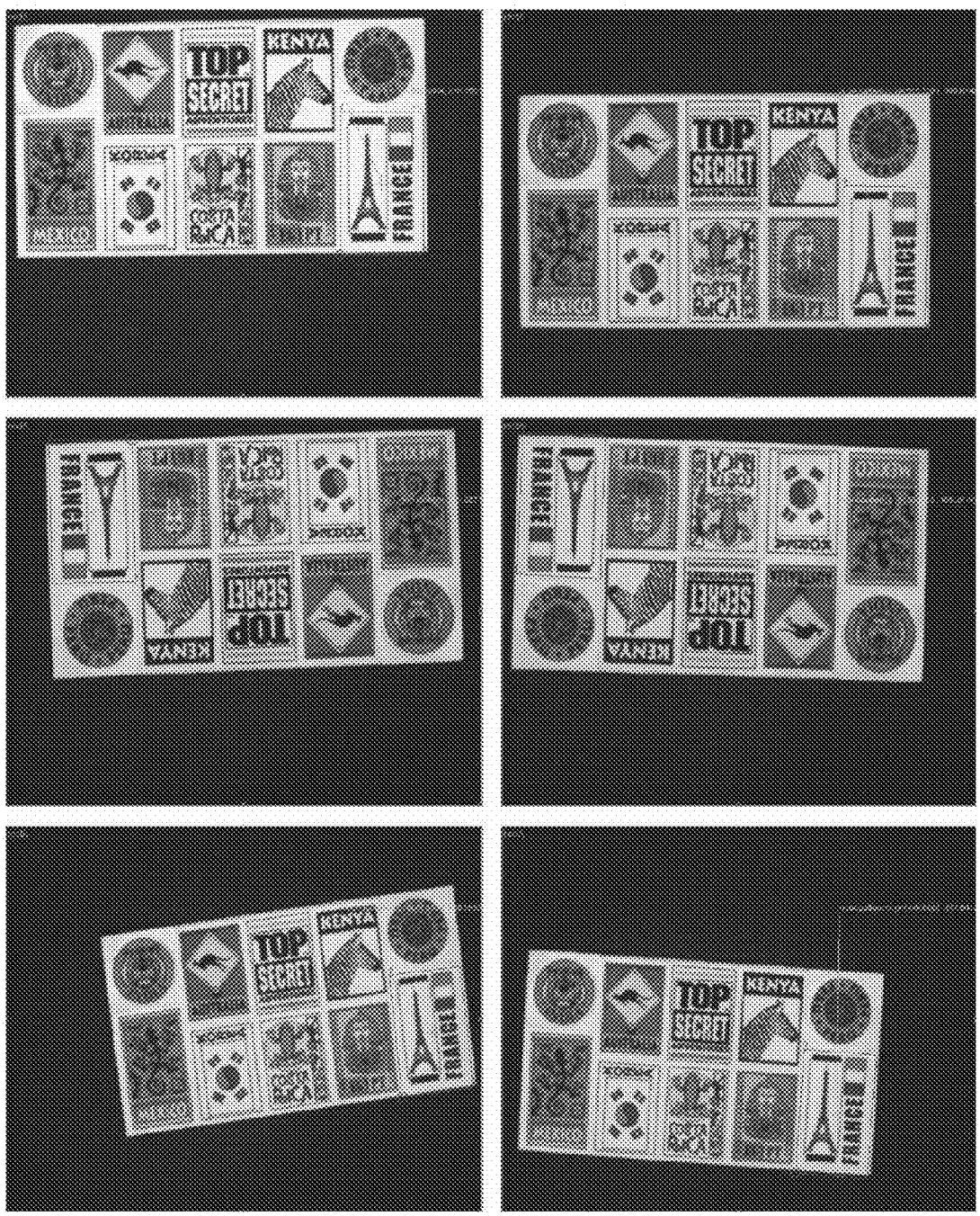

FIG. 32 shows logos representing different countries on a pamphlet. The algorithm can be trained on one or more of the countries (e.g. if the algorithm is trained on the "France" logo), the algorithm is capable of finding the France logo even though there are many other similar and straight line rich patterns in the image.

As a practical contribution, the aspects of the present invention may be used in a wide variety of application including, for example, autonomous guidance of vehicle convoy by having successive vehicles lock on a pattern on the back of the preceding vehicle; guide vehicles by finding the straight edges in road marking at the middle and at the edge of the road; and applications wherein a closed-loop guidance and/or control system is utilized that requires a fast searching algorithm.

Figure 33:
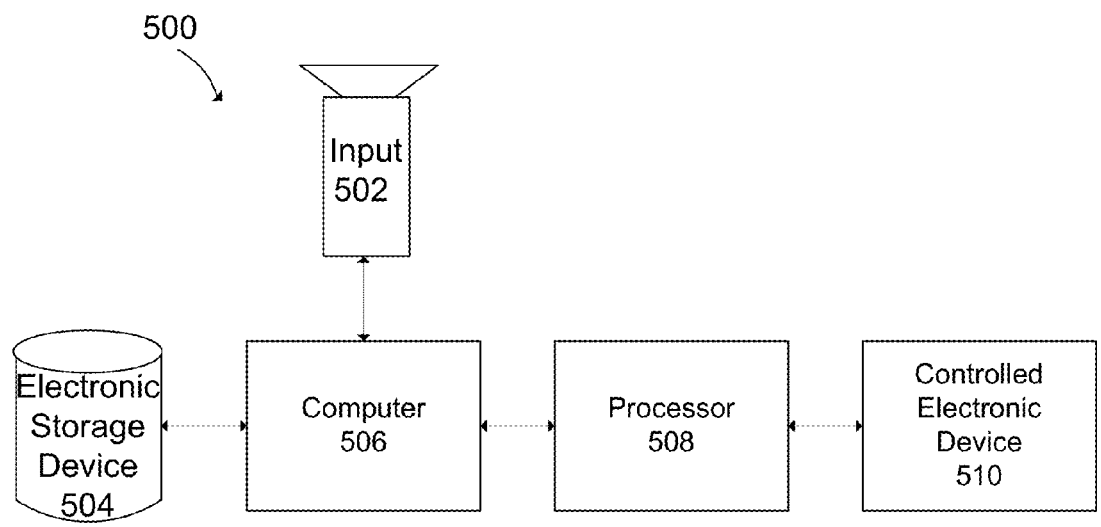
FIG. 33 is a block diagram of a system in accordance with aspects of the present invention.

FIG. 33 illustrates an exemplary feedback system 500 that may be used in accordance with the aspects of the present invention. The system 500 may include an optical input device 502 (e.g., a CCD camera) and/or an electronic storage device 504 for providing a learned image and/or a target image to a processor 506. The output of the devices 502, 504 may be input to a processor 506 that has computer code that is functional to carry out the desired functionality. The processor 506 may generate a control signal to a controller 508 (e.g., programmable logic controller) that may be used to control one or more electronic devices 510 (e.g., vehicle navigation system, tracking system, etc.). A feedback signal may be generated by the electronic device 510 to the controller 508 and/or processor 506 in order to control the particular application in which the invention is being applied.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". It should also be noted that although the specification lists method steps occurring in a particular order, these steps may be executed in any order, or at the same time.

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

What is claimed is:

1. A method for training a computer vision system to recognize a reference object provided in an electronic form, the method comprising using a computer to perform the steps of:

extracting line segment information from one or more contour points in the reference object by grouping contour points, wherein the line segment information is selected based on the one or more contour points having a curvature at or near zero as a line;

storing the line segment information in a computer readable form;

processing the line segment information to extract at least one image patch from the reference object, wherein the at least one image patch comprises a sub-image of the reference object that is scale and rotation invariant and includes at least one linear feature formed by the one or more contour points, the at least image patch including at least one end point associated with the linear feature and the at least image patch having a size determined by a distance between the least one end and an end contour point; and storing the at least one image patch in a computer readable form, wherein the at least one image patch is associated with the reference object.

2. The method of claim 1, wherein the line segment information includes at least one from the group consisting of: an endpoint, a midpoint, a line angle or a line length for the one or more line segments.

3. The method of claim 2, wherein the line segment information includes at least one contour point.

4. The method of claim 3, wherein the line segment information includes a vector from the midpoint for each of the one or more line segments to a reference point.

5. The method of claim 1, wherein the computer readable form is a database.

6. The method of claim 1, wherein the reference object is provided from an electronic computer aided design file.

7. The method of claim 1, wherein the at least one image patch is extracted for all linear features of the object having a segment length above a length threshold value.

8. The method of claim 1 further including fitting an analytic line to the line segment using linear regression for representation of the at least one image patch.

9. The method of claim 8, wherein the analytic line utilizes the end point associated with the linear feature and the end contour point.

10. The method of claim 1 further including storing information related to the at least one image patch in a database of image patches.

11. The method of claim 10, wherein the at least one image patch is stored for all linear features of the object having a segment length above a length threshold value.

12. The method of claim 10, wherein the information includes a length associated with at least one image patch.

13. The method of claim 10, wherein the information includes a scale associated with at least one image patch.

14. The method of claim 10, wherein the information includes an image patch angle, wherein the image patch angle is the relation between the image patch and a reference point in the object.

15. The method according to claim 1, wherein the line segment information includes information corresponding to an endpoint of the line segment, and wherein the image patch is centered at the endpoint.

16. The method according to claim 1, wherein the line segment information includes information corresponding to length of the line segment, and wherein a size of the image patch is proportional to a the length of the line segment.

17. The method according to claim 1, wherein the line segment information includes information corresponding to an angle of the line segment, and wherein an orientation of the image patch corresponds to the angle of the line segment.

* * * * *